United States Patent [19]

Pistner

[11] Patent Number: 4,699,608

[45] Date of Patent: Oct. 13, 1987

[54] METHOD OF MAKING THERMOPLASTIC BAG AND BAG PACK

[75] Inventor: Timothy W. Pistner, Fairport, N.Y.

[73] Assignee: Mobil Oil Corporation, New York, N.Y.

[21] Appl. No.: 849,638

[22] Filed: Apr. 9, 1986

Related U.S. Application Data

[62] Division of Ser. No. 777,110, Sep. 18, 1985.

[51] Int. Cl.$^4$ ............................................. B65D 85/62
[52] U.S. Cl. ...................................... 493/204; 493/926
[58] Field of Search ........................ 493/226, 926, 204; 53/397; 206/554

[56] References Cited

U.S. PATENT DOCUMENTS

| | | | |
|---|---|---|---|
| 4,386,924 | 6/1983 | Crawford et al. | 493/926 X |
| 4,395,252 | 7/1983 | Lehmacher | 493/926 X |
| 4,476,979 | 10/1984 | Reimann et al. | 206/554 |
| 4,480,750 | 11/1984 | Dancy | 206/554 |
| 4,529,090 | 7/1985 | Pilon | 206/554 |
| 4,560,067 | 12/1985 | Reimann | 206/554 |
| 4,562,925 | 1/1986 | Pistner | 206/554 |
| 4,588,392 | 5/1986 | Maddock | 493/226 X |

Primary Examiner—James F. Coan
Attorney, Agent, or Firm—A. J. McKillop; M. G. Gilman; J. P. O'Sullivan, Sr.

[57] ABSTRACT

A thermoplastic bag structure having, in its lay-flat condition, a front and rear bag wall, a two-film heat seal bottom; the outer side margins of the full length of said bag being folded toward but spaced from each other. The top most edge of each fold is heat sealed through the four films thereof along line corresponding to the width of the folds. An open mouth top portion being characterized by having double film handle loops at opposite ends of said mouth, said double film loops being extensions of the folded regions of said bags and the corresponding regions of said front and rear walls. The bag structures can be unitized by providing a detachable tab at the bag mouth opening and unitizing the bag structures through this tab. The method of forming said bags involves providing an end sealed collapsed thermoplastic film tube, folding the sides of the tube toward but spaced from each other, heat sealing one end of the tube through four layers thereof and removing plastic from this end of the structure to form a bag mouth and handles at one end thereof. The resulting bag is an ungusseted bag which can be unitized into a pack by providing a detachable, unitizing tab at the bag mouth opening.

4 Claims, 4 Drawing Figures

METHOD OF MAKING THERMOPLASTIC BAG AND BAG PACK

This is a divisional of copending application Ser. No. 777,110, filed on Sept. 18, 1985.

This invention is concerned with a thermoplastic handled sack, a plurality of said sacks unitized into a bag pack and a method for preparing the same.

BACKGROUND OF THE INVENTION

Handled thermoplastic sacks are well known and are finding increasing use in the grocery sack market. Far and away the most common type of thermoplastic handled grocery sack is one made from a gussetted tube sealed at the top and the bottom with a suitable bag mouth and handle cutout, which yields a double layer of film in the handled region. There are two problems associated with this type of bag. One problem is the fact that the gusset folds of the bag are of necessity trapped in the bottom seal of the bag. This prevents the gusset from extending fully as product is loaded into the bag, which results in a wasteful loss of volume. The other problem is that where there are transitions from four-layers to two-layers along the heat-seal line of the bottom of the bag and forces are brought to bear at these transition points, as the bag attempts to expand, tears develop on both sides of the bag at the transition points.

It is an object of the present invention to provide a bag and a method of making the same which bag will have maximum volumetric efficiency.

It is a further object of the present invention to provide maximum volumetric efficiency in a handled thermoplastic bag without sacrificing bag strength in the handled region of the bag.

SUMMARY OF THE INVENTION

The present invention is directed to a method for forming a thermoplastic film handled sack comprising:

(a) forming a collapsed thermoplastic film tube, first heat-sealed transversely at least at one end thereof;

(b) folding opposite sides of the sealed tube toward but spaced from each other, along lines perpendicular to the heat-seal;

(c) heat-sealing the folded over sides at one end of the tube a bag length distance spaced from said first heat-seal along lines corresponding to the fold widths to form two spaced quadruple film seal lines; and (d) removing from the quadruple film seal end of said tube, film regions sufficient to form a bag mouth opening and double film handle loops at opposite ends of said bag mouth opening.

The invention is also directed to a method for forming a unitized pack of thermoplastic film handled sacks comprising:

(a) forming a collapsed thermoplastic film tube, first heat-sealed transversely at least at one end thereof;

(b) folding opposite sides of the sealed tube toward but spaced from each other, along lines perpendicular to the first heat-seal;

(c) heat sealing the folded over sides at one end of the tube a bag length distance from said first heat seal, along lines corresponding to the fold widths to form two spaced quadruple film seal lines;

(d) stacking a plurality of such folded and sealed stuctures one upon the other in registration; and (e) simultaneously performing a cutting, perforating and unitizing operation at the quadruple film seal end of the stack that will form two double film loop handles with a bag mouth opening therebetween and tab members, attached by way of film perforations to the edges of said bag mouth opening, said tab members being unitized, thereby forming said pack of sacks.

The invention is further directed to a thermoplastic bag structure comprising, in its lay-flat condition, a front and rear bag wall, a 2-film heat seal bottom; the outer side margins of the full length of the bag being folded toward but spaced from each other, the top most edge of each fold is heat sealed through the four films thereof along lines corresponding to the width of the folds, an open mouth top portion being characterized by having double film handle loops at opposite ends of said mouth, said double film loops being extensions of the folded regions of said bag and the corresponding regions of said front and rear walls.

The invention is still further directed to a pack of thermoplastic bags comprising a plurality of the superimposed bag structures as defined above having tab members detachably attached to the upper edges of the bag mouth, said tabs being unitized to hold the bags together in a pack.

DETAILED DESCRIPTION OF THE INVENTION

It is well known in the plastics art to continuously melt extrude thermoplastic resin through an annular orifice, apply internal fluid pressure to the tube thus extruded and thereby expand the tube and reduce the wall thickness thereof to appropriate dimensions while cooling and solidifying the extruded thermoplastic film. This technique and any equivalent technique of forming a thermoplastic film tube, can be employed in prodidng the starting material for the bags and bag packs of the present invention.

The contemplated thermoplastic film can be of any type having the characteristics necessary for a handled bag which will be required to carry items totaling up to about 45 lbs. or more. While not limited to the polyolefins, these materials have proven in the past to be excellent films from which bags can be made. Preferred materials include polyethylene, generically and, specifically, low density polyethylene, high density polyethylene, including high molecular, high density polyethylene, linear low density ethylene copolymerized with a $C_3$–$C_8$ alpha olefin and blends and mixtures of the same. In addition, the polyethylenes can be blended with certain aromatic polymers in order to impart special desirable physical characteristics thereto. For example, linear low density polyethylene can be blended with up to about 10% by weight of polystyrene or polyparamethyl styrene. A specific example of a commercially available polyethylene material suitable for use in the present invention is a linear low density ethylene copolymerized with from about 2 to about 7 wt. % of octene-1.

Figures 1, 2:
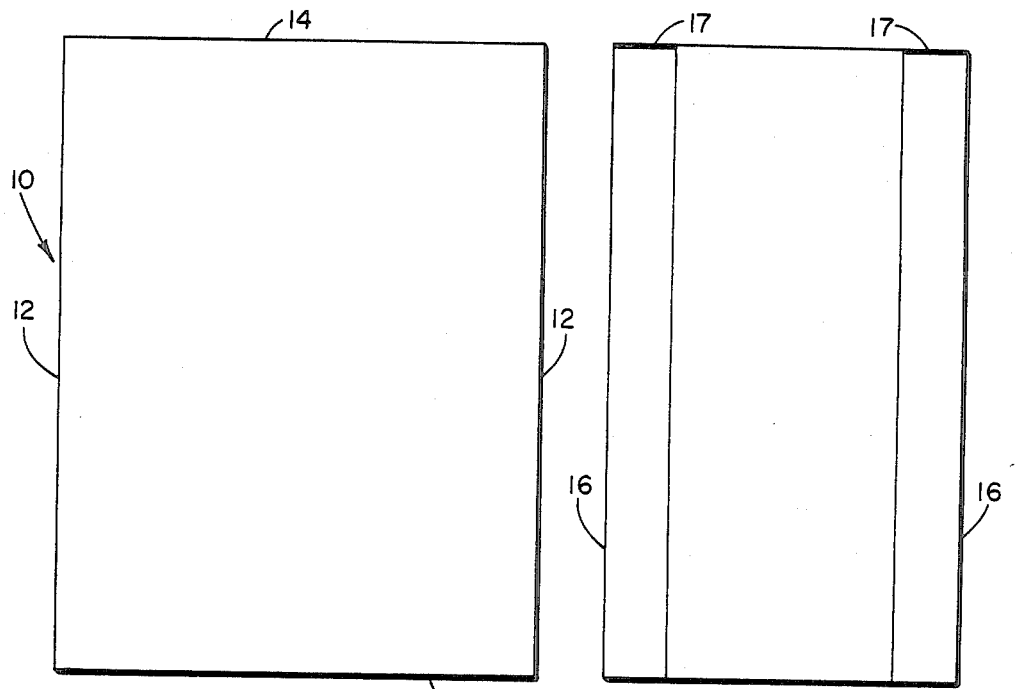
FIG. 1 is a plan view of a collapsed end sealed thermoplastic tube.
FIG. 2 is a plan view of the tube of FIG. 1 with the sides folded toward each other and having four film seals at one end thereof.

This linear low density ethylene-octene-1 copolymer, i.e., LLDPE, is melt extruded through an annular orifice and blown up to a tube which will have a lay flat diameter of approximately 19.5 inches. This tube is then collapsed and formed into heat-sealed segments approximatey 25 inches long. This will produce what is known as a sealed "pillowcase" 10 as shown in FIG. 1. The sides 12 are seamless and the ends 14 are heat-sealed. Heat-seal 14 constitutes a thermal merging of the two films of the collapsed tube. The seals 14 can be made so that they simultaneously seal and sever through the films or the seals may be made not to sever through but merely weaken the region adjacent to line 14 so they may be subsequently severed with comparatively little force. This latter technique is preferred because the next step in the process calls for folding over the seamless sides of the tube, as shown at 16 in FIG. 2. The degree of foldover is related to the ultimate width of the desired handles and the width of the bag mouth opening. Employed a lay-flat tube having a side-to-side dimension of approximately 19.5 inches, the individual handle widths can range anywhere from about 1 to 4 inches, preferably from about 1 and ½ to 3 inches. After folding over the sides of the pillowcase segment, a heat seal means heat seals the four layers at the top end of the fold on both sides of the pillow case as shown at 17. This heat seal through the four layers will ultimately form the seams of the two film loop handles of the bag.

Figures 3, 4:
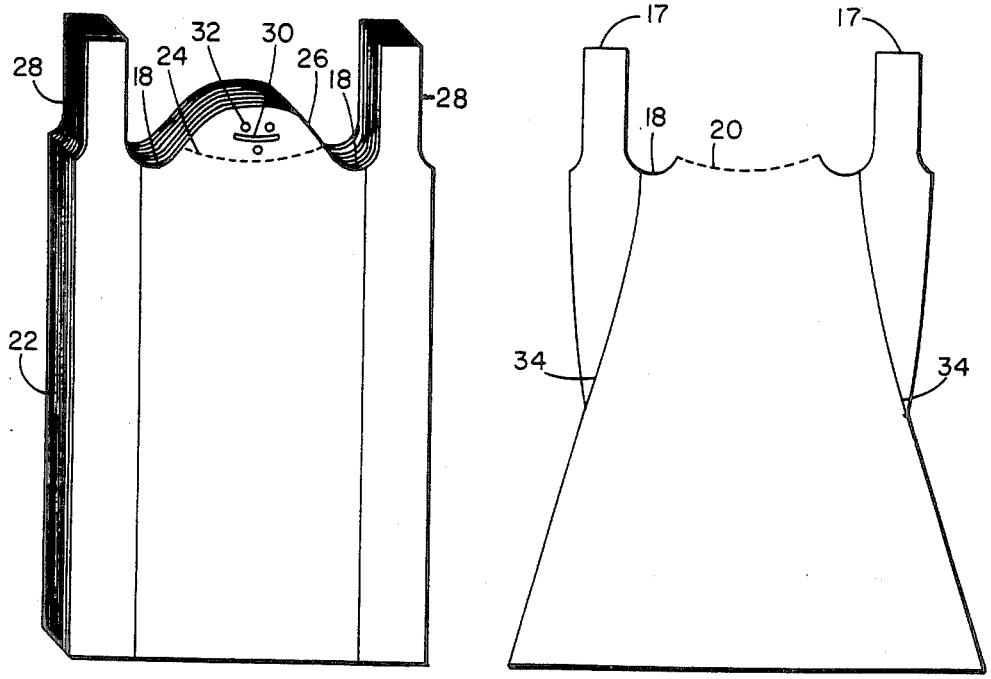
FIG. 3 is a isometric view of a unitized stack of bags of the type described herein.
FIG. 4 is a plan view of a single detached bag in its partially unfolded condition.

In forming the bags contemplated by the present invention, a plurality of the side-folded and quadruple film sealed structures, shown in FIG. 2, are stacked in registration and by the use of a suitable cutting mechanism, the handles and bag mouth opening are formed by the removal of plastic film from one end of the stack to result in a bag pack as depicted in FIG. 3. If, however, a simple bag structure is desired where only individual bags are formed, a cutting member defining a broad U can strike out this configuration at one end of the stack of bags. Simultaneously in the upper left and upper right hand regions of the stack, by means of a somewhat half parabolic cutter, plastic film of the corresponding configuration is removed so as to provide hand-access to the resulting double film loop handles.

Referring to FIG. 3, there is shown a stack of bags having handles and a bag mouth opening of a more complex design. The handles and bag mouth opening show that at the base of the handles there are stress relief regions 18 which function to cause stress forces which ordinarily would be brought to bear along bag mouth line 20 (see FIG. 4) to concentrate at points below this line. Thus, stress forces will literally extend through the film space between the bottoms of the arcs of stress relief regions 18. Bag mouth opening 20 is the consequence of removing an individual bag from the bag pack 22 of FIG. 3 by tearing the same along perforation 24 of FIG. 3. Even where the connecting points between tab 26 and the bag proper are few in number, in the absence of stress-relief regions, such as that illustrated at 18, tears tend to initiate somewhere along the edge of the bag mouth opening.

As indicated above, the device which forms the handles and bag mouth opening can also perform several other functions simultaneously, for example, forming detachable bag tabs.

It is necessary in order to accommodate the carrying hand of the user to open the upper left and right sides of the structures as at 28. This is accomplished by providing for a cutting member which will remove a hand-accommodating slice from each pillowcase structure. As with the portion removed from the region between the handles, this portion can be returned for recycle as usable resin material.

In forming a unitized pack of bags, such as is illustrated in FIG. 3, the tab members 26 can be designed to have sufficient area so that an orifice 30 can be formed therein. Orifice 30 functions to permit the unitized stack of bags to be suspended from a suitable holding member which will accommodate dispensing of the bags. A suitable bag pack holding and dispensing device is described in U.S. Pat. No. 4,062,170 which is incorporated herein in its entirety by reference. The bag pack of FIG. 3 can be utilized with this dispenser rack by suspending the pack from orifice 30 by placing the same around the tongue or holder member of the rack of the above-identified patent. A plurality of individual bags of the pack of FIG. 3 are unitized together by one or more heat sealed regions 32 fused completely through all of the tabs 26 of the bag structures. FIG. 3 shows three heat fused regions 32, two above orifice 30, and one below. These fused regions also serve to reinforce and strengthen orifice 30 since a pack of bags can contain 50, 100 or more bags in a pack. These bag packs tend to become quite heavy and distortion of the suspension orifice is possible without such reinforcing means. A convenient manner of forming the heat fused regions is by employment of an ultrasonic plastic welding device. If the bag pack is to be employed with a dispensing rack of the type defined in the above-identified patent then after suspension of the pack from orifice 30 the handles are unfolded and the loops thereof are spread open and about the ears of the rack. During this operation an individual bag is torn free of the tab along the perforation line 24. The bag is then conveniently in a proper position for loading the purchased goods. It will be seen that a bag of the present structure makes maximum use of the potential volume of the original collapsed cylinder.

As illustrated in FIG. 4, the ungusseted but side folded structure does not have regions predisposed to tear in the bottom of the bag. If there were a trapped four layer gusset in the bottom of the bag, such would be the case. With the four layers of film heat sealed together at 17, thereby completing a two film loop handle the remainder of the body of the bag is capable of fully unfolding as partially shown at 34. Thus, the maximum possible volume of this bag can be utilized.

It should be evident that various other modifications can be made to the described embodiment without departing from the scope of the present invention.

What is claimed is:

1. A method for forming a thermoplastic film handled sack comprising:
   (a) forming a collapsed film tube, first heat-sealed transversely at least at one end thereof;
   (b) folding opposite sides of the sealed tube toward but spaced from each other along lines perpendicular to the heat-seal;
   (c) heat-sealing the folded over sides at one end of the tube a bag length distance spaced from said first heat-seal along lines corresponding to the fold widths to form two spaced quadruple film seal lines; and
   (d) removing from the quadruple film seal end of said tube, film regions sufficient to form a bag mouth opening and double film handle loops at opposite ends of said bag mouth opening.

2. The method of claim 1 wherein the film removal is accomplished by a cutting action.

3. A method for forming a unitized pack of thermoplastic film handled sacks comprising;
   (a) forming a collapsed thermoplastic film tube, first heat-sealed transversely at least at one end thereof;
   (b) folding opposite sides of the sealed tube toward but spaced from each other, along lines perpendicular to the first heat-seal;
   (c) heat sealing the folded over sides at one end of the tube a bag length distance from said first heat seal, along lines corresponding to the fold widths to form two spaced quadruple seal lines;
   (d) stacking a plurality of such folded and sealed structures one upon the other in registration; and
   (e) simultaneously performing a cutting, perforating and unitizing operation at one end of the stack that will form two double film loop handles with a bag mouth opening therebetween and tab members, attached by way of film perforations to the edges of said bag mouth opening, said tab members being unitized, thereby forming said pack of sacks.

4. The method of claim 3 wherein said tabs are unitized by heat sealing and a suspension orifice is also formed therein.

* * * * *